United States Patent
Hoolhorst et al.

[11] Patent Number: 6,112,995
[45] Date of Patent: Sep. 5, 2000

[54] CARD READER

[75] Inventors: Albert Hoolhorst, Be Aardenburg, Netherlands; Paul Ryckaert, Watervliet, Belgium

[73] Assignee: Siemens Aktiengesellschaft, Munich, Germany

[21] Appl. No.: 09/174,734

[22] Filed: Oct. 19, 1998

Related U.S. Application Data

[63] Continuation of application No. PCT/DE97/00774, Apr. 17, 1997.

[30] Foreign Application Priority Data

Apr. 19, 1996 [DE] Germany ............... 196 15 658

[51] Int. Cl.⁷ .......................... G06K 08/00; G06K 19/06
[52] U.S. Cl. ........................ 235/486; 235/492; 235/475
[58] Field of Search ........................... 235/475, 486, 235/492, 487, 477, 479, 441

[56] References Cited

U.S. PATENT DOCUMENTS

| | | |
|---|---|---|
| 4,678,252 | 7/1987 | Moore . |
| 5,320,552 | 6/1994 | Reichardt et al. . |
| 5,550,361 | 8/1996 | Huis et al. ............... 235/440 |
| 5,815,570 | 9/1998 | Hannon et al. ............... 379/428 |
| 5,820,459 | 10/1998 | Acres et al. ............... 463/25 |
| 5,836,817 | 11/1998 | Acres et al. ............... 463/26 |
| 5,850,440 | 12/1998 | Hannon et al. ............... 379/446 |
| 5,892,216 | 4/1999 | Grant et al. ............... 235/492 |
| 5,894,597 | 4/1999 | Schwartz et al. ............... 455/558 |

FOREIGN PATENT DOCUMENTS

| | | |
|---|---|---|
| 0476892A1 | 3/1992 | European Pat. Off. . |
| 0520080A1 | 12/1992 | European Pat. Off. . |
| 41 38 342 A1 | 5/1992 | Germany . |

*Primary Examiner*—Thien M. Le
*Attorney, Agent, or Firm*—Herberet L. Lerner; Laurence A. Greenberg; Werner H. Stemer

[57] ABSTRACT

A card reader for receiving or passing on information furnished by or for a card. The card reader is embodied such that it can be mounted on a printed circuit board by connecting devices for mechanically and electrically connecting the card reader to the printed circuit board. The card reader described is distinguished in that the connecting portion of the card reader intended for making a mechanical connection between the card reader and the printed circuit board are provided, locally separated from the contact elements of the card reader to be brought into electrical contact with the printed circuit board.

8 Claims, 3 Drawing Sheets

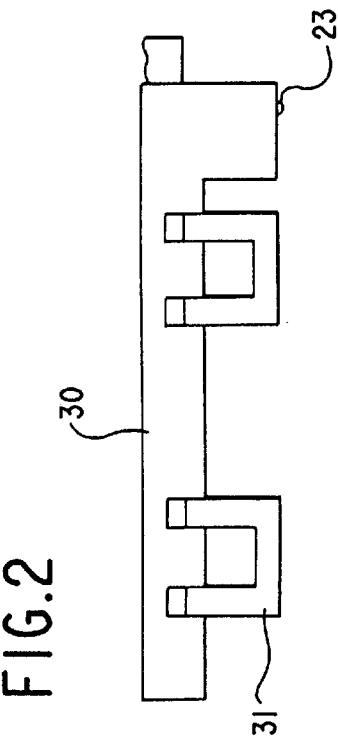
FIG.2
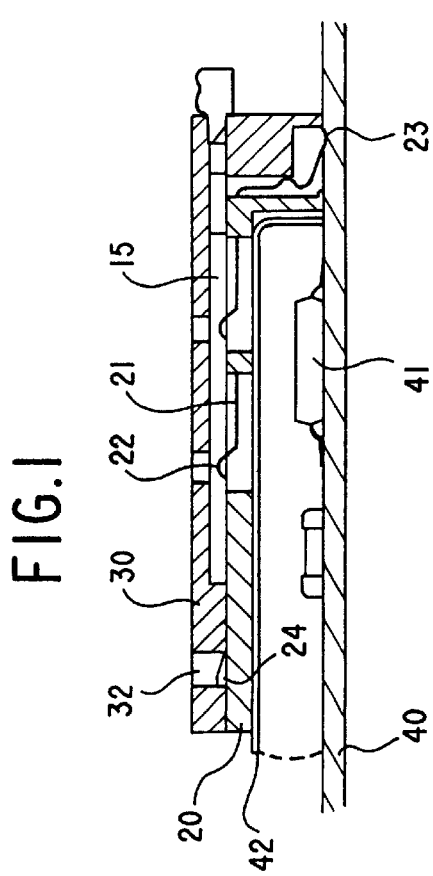
FIG.1
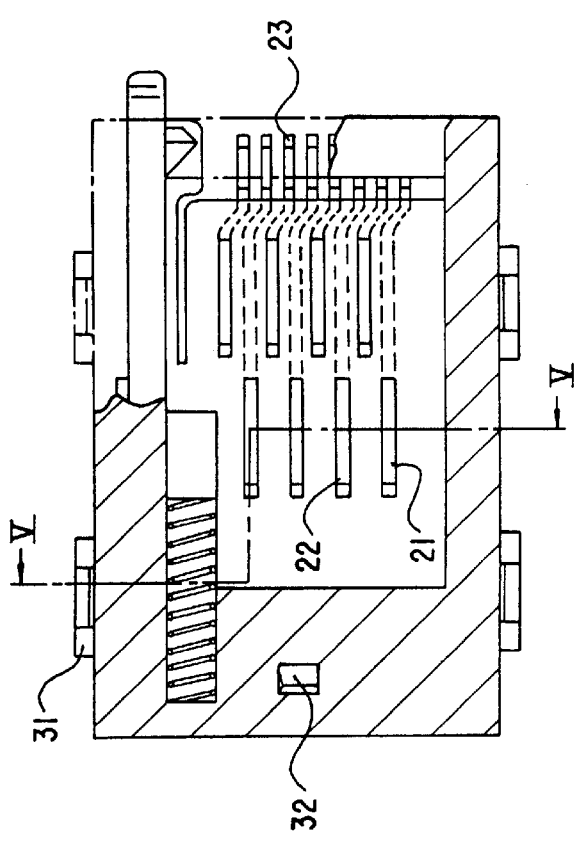
FIG.4
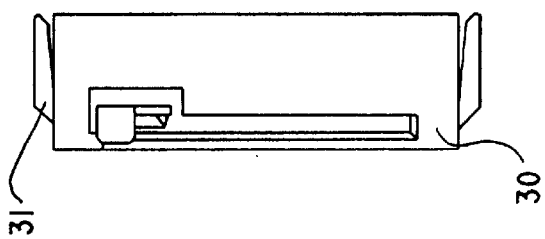
FIG.5
FIG.3

CARD READER

CROSS-REFERENCE TO RELATED APPLICATION

This is a continuation of copending International Application PCT/DE97/00774, filed Apr. 17, 1997, which designated the United States.

BACKGROUND OF THE INVENTION

Field of the Invention

The invention relates to a card reader for receiving or passing on information furnished by or for a card, in which the card reader is embodied such that it can be mounted on a printed circuit board by being mechanically and electrically connected thereto.

One such card reader is known for instance from European Patent Disclosure EP 0 472 692 B1. The known card reader is intended for reading so-called SIM cards or SIM modules. SIM modules are currently used above all in mobile telephones, for identifying subscribers. "SIM" is the abbreviation for "Subscriber Identity Module". SIM modules, particularly because of their small size (25×15 mm), are increasingly replacing the relatively large chip cards earlier used for that purpose. The SIM module generally has on its surface a plurality of surface contacts, as a rule 6 or 8 contacts, which are precisely defined in terms of their location. The surface contacts are to be connected by the card reader to corresponding terminals of a printed circuit board on which the card reader itself is mounted to enable communications.

Although the SIM modules are relatively small and the card readers intended for them are not substantially larger, the card reader still occupies a relatively large amount of space on the printed circuit board on which it is mounted (typically using an SMT soldering process). For this reason, the printed circuit board area to be furnished must be made relatively large and is difficult to minimize. This is disadvantageous because of the constant demand for miniaturizing items of all kinds, especially in mobile phones and the like.

SUMMARY OF THE INVENTION

It is accordingly an object of the invention to provide a card reader that overcomes the above-mentioned disadvantages of the prior art devices of this general type, in which the space on the electrical printed circuit board on which the card reader is mounted or is to be mounted can be utilized more efficiently, and that the printed circuit board area to be provided can thus be markedly reduced.

With the foregoing and other objects in view there is provided, in accordance with the invention, in combination with a printed circuit board having elements, a card reader for receiving and passing on information furnished by or for a card, the card reader mountable on the printed circuit board, including: a card reader body; a connecting portion disposed on the card reader body making a mechanical connection between the card reader body and the printed circuit board; contact elements disposed on the card reader body in a locally separated fashion from the connecting portion and making an electrical contact with the printed circuit board; and the card reader body extending at least partly in an upper plane over the elements mounted on the printed circuit board if the card reader body is mounted on the printed circuit board.

It is accordingly provided that the portions of the card reader intended for making a mechanical connection between the card reader and the printed circuit board are provided, locally separated from the portions of the card reader to be brought into electrical contact with the printed circuit board.

The mechanical connection and the electrical connection between the card reader and the electrical printed circuit board can accordingly be achieved entirely independently of one another. This makes it possible among other things to accomplish the electrical connection between the card reader and the electrical printed circuit board in the form of a solder-free contact-pressure connection, and to accomplish the mechanical connection between the card reader and the electrical printed circuit board by direct or indirect detent locking, clamping or the like, or in other words again without solder.

The dispensation with soldering the card reader and the electrical printed circuit board has the positive effect that the card reader can finally, that is, only after the conclusion of the soldering work on the printed circuit board, be placed (without solder) on the printed circuit board. This in turn makes it possible in a simple way, that is, with the provision of only a minimal number of work steps, for the card reader to extend a considerable distance in a plane over the components already mounted on the printed circuit board, without in the least bit hindering the mountability and accessibility of the components.

This kind of multi-layered disposition of components to be provided on one side of a printed circuit board, which until now could not be achieved at all, or at best could be achieved only with difficulty and/or unreliably, opens up the possibility of accommodating a larger number of components per unit of printed circuit board area.

The card reader is thus created which in an extremely simple, elegant way makes it possible for the space on the electrical printed circuit board, on which the card reader is mounted or is to be mounted, to be utilized more effectively and thus to markedly reduce the printed circuit board area to be provided.

In accordance with an added feature of the invention, the card reader body has a contact carrier part carrying the contact elements and a cover part disposed on the carrier part.

In accordance with an additional feature of the invention, the contact elements include spring bumps having solder-free contact-pressure connections with contact points for contacting the card and the printed circuit board.

In accordance with another feature of the invention, the card reader body mechanically connects to the printed circuit board without soldering in a detent locking fashion.

In accordance with a further added feature of the invention, the printed circuit board has a shielding cage, and at least one of the contact carrier part and the cover part detent-locking with the shielding cage.

In accordance with a further additional feature of the invention, the connecting portion and the contact elements are disposed and embodied such that the card reader body cannot be mounted onto the printed circuit board until after the elements to be soldered to the printed circuit board have been soldered.

In accordance with a concomitant feature of the invention, the connecting portion and the contact elements are disposed and embodied such that after the card reader body has mounted on the printed circuit board, the card reader body can be detached again from the printed circuit board.

Other features which are considered as characteristic for the invention are set forth in the appended claims.

Although the invention is illustrated and described herein as embodied in a card reader, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic sectional view of a configuration containing a card reader according to the invention;

FIG. 2 is side elevational view of the card reader removed from the configuration shown in FIG. 1;

FIG. 3 is a front elevational view of the card reader shown in FIG. 2 rotated 90°;

FIG. 4 is a sectional view seen from above, relative to the view in FIG. 1, of the configuration shown in FIG. 1;

FIG. 5 is a sectional view taken along a line V—V of FIG. 4;

Figure 6:
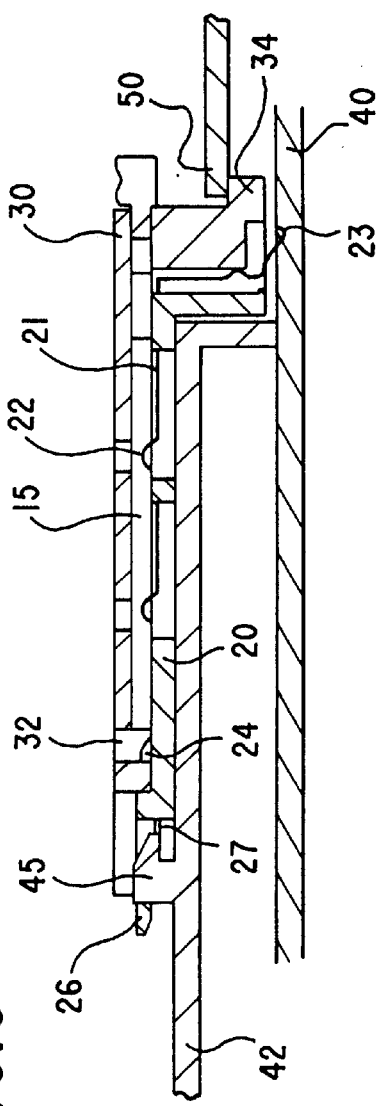
FIG. 6 is a sectional view of a second exemplary embodiment of the configuration containing the card reader.

DESCRIPTION OF THE PREFERRED EMBODIMENTS:

The card reader described below is suited for receiving and/or passing on information furnished by or for a SIM card (SIM module) and the like. In principle, that is, with suitable adaptation to altered conditions, however, it is also usable for cards of arbitrary other shapes and dimensions and arbitrary other kinds of cards.

In all the figures of the drawing, sub-features and integral parts that correspond to one another bear the same reference symbol in each case. Referring now to the figures of the drawing in detail and first, particularly, to FIG. 1 thereof, there is shown in a lateral sectional view of a card reader.

In the present exemplary embodiment, the card reader substantially includes two components, namely a contact carrier part 20 and a cover part 30, which in the assembled state of the card reader is placed thereon. A card slot 15 is left open between the contact carrier part 20 and the cover part 30, and a SIM module can be inserted into the slot for reading (from right to left in terms of the view in FIG. 1).

Figure 10:
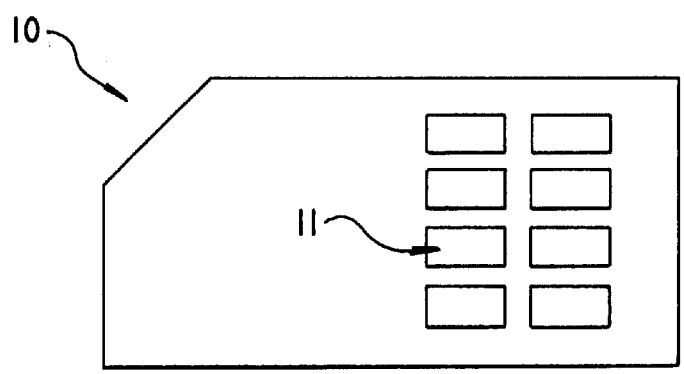
FIG. 10 is a plan view of a SIM card or SIM module.

The plan view of one such SIM module is shown in FIG. 10. The SIM module 10 shown there has on its surface a plurality of surface contacts 11 (as a rule, 6 or 8 of them), that are precisely defined in terms of their location. The surface contacts 11, to enable communication with the SIM module, are to be connected by the card reader to corresponding terminals of a printed circuit board 40 on which the card reader itself is mounted.

The contact carrier part 20 has a plurality of contact elements 21, whose task is to connect the surface contacts 11 of the SIM module 10 electrically with corresponding terminals of the electrical printed circuit board 40, on which the card reader and other electronic, electrical and electromechanical components 41 are mounted or are to be mounted.

The ends of the contact elements 21 that are intended to contact the surface contacts 11 of the SIM module 10 are embodied as spring bumps 22 and are positioned such that when the SIM module 10 has been inserted properly, that is, in its reading position, the spring bumps 22 can reliably and securely contact its surface contacts 11 by suitably pressing against them (solder-free contact-pressure connection). The provisions to be made in detail for this purpose should be feasible for one skilled in the art without further explanation.

The other ends of the contact elements 21, that is, those portions of the contact elements 21 that are intended to contact the corresponding terminals of the printed circuit board 40, are likewise embodied as spring bumps 23, as can be seen from FIG. 1, and thus this connection as well can be made in the form of a solder-free contact-pressure connection.

As already noted above, in the assembled state of the card reader, the cover part 30 is disposed above the contact carrier part 20.

As particularly seen from FIGS. 2–4, of which FIG. 2 shows a side view of the card reader removed from the configuration in FIG. 1. FIG. 3 shows a front view of the card reader removed from the configuration of FIG. 1, and FIG. 4 shows a sectional view from above, as in the view in FIG. 1 of the configuration shown there. The cover part 30 has a plurality of detent elements, in the form of detent levers 31, which are used to secure the cover part 30 and the contact carrier part 20 to or in a configuration containing the card reader, or more precisely for fastening them to a housing, the printed circuit board 40, printed circuit boards, items mounted on the printed circuit board(s) 40, or other components of the configuration. As seen particularly from FIG. 5, which is a sectional view along a line V—V of FIG. 4, the fastening is effected in the exemplary embodiment in question primarily by detent locking of the detent levers 31 with corresponding counterparts in the form of detent protrusions 43 on the side walls of a high-frequency shielding cage 42 on the printed circuit board 40.

Along with the detent locking of the cover part 30 to the shielding cage 42, the contact carrier part 20 is clamped between these elements. The contact carrier part 20, the cover part 30, and the locking mechanism 31, 43 are embodied and dimensioned such that the contact carrier part 20 is fixed in a stationary (immovable) fashion at a precisely predetermined point by putting the cover part 30 and the shielding cage 42 into engagement with one another, that is, by mechanically connecting them. The fixation position of the contact carrier part 20 and/or its configuration is selected such that the spring bumps 23 of the contact elements 21 of the contact carrier part 20, in this position of the contact carrier part, come into contact precisely with the terminal points (surface contacts) provided for the purpose on the printed circuit board 40, forming a contact-pressure connection.

By the detent locking of the cover part 30 and the shielding cage 42, which latter is in turn also connected to the printed circuit board 40, on which the card reader is to be mounted or as described is mounted, the card reader is accordingly connected both mechanically and electrically to the printed circuit board 40.

In contrast to previous mounting processes, and in particular in contrast to soldering the card reader and printed circuit board 40 together (for instance by an SMT process), the portions of the card reader (detent protrusions 31) intended to make the mechanical connection between the card reader and the printed circuit board 40 are provided in a separate location from the portions of the card reader (of the spring bumps 23 of the contact elements 21) to be put into electrical contact with the printed circuit board.

This separation of mechanical and electrical connecting elements makes it possible, as can easily be replicated in the exemplary embodiment described, to dispense with soldering entirely when mounting the card reader on the printed circuit board.

It is possible for the card reader to be placed on the printed circuit board 40, with attendant electrical and mechanical connection taking place, only after all the components 41 to be soldered to the printed circuit board 40 have been soldered.

Given suitable shaping of the card reader, it is possible, as seen particularly from FIG. 1, for the card reader to extend at least partway in an upper plane over components 41, 42 that are already mounted (for instance, soldered) on the printed circuit board 40.

When the card reader and printed circuit board 40 were soldered together, as was previously done, such a multi-layer structure over one side of a printed circuit board would have been possible only inconveniently and/or unreliably.

Specifically, if one wanted to solder all the components, including the card reader, onto the printed circuit board 40 in a single operation, then the components to be disposed below the card reader, particularly if soldering is done by the SMT soldering process that is predominantly employed today, would be accessible only with major difficulty which would make the soldering process extremely complicated and unreliable, or even impossible. Conversely, if one wanted to solder the card reader onto the printed circuit board only at the end, that is, after the components provided in the lower plane had been soldered, this would have required another passage through the soldering line, which as can be appreciated would cause considerable additional expenses. Regardless of the way in which the finished printed circuit board is manufactured, maintenance and repair of the printed circuit board, and in particular maintenance and repair of the components covered by the card reader, would be very complicated, because under some circumstances this would have required unsoldering the card reader so as to enable access to the covered components.

Solder-free mounting of the card reader on the printed circuit board thus, in an extremely simple way, opens up previously unknown possibilities for printed circuit board miniaturization.

It is understood that this effect is attainable not only if the mechanical connection between the card reader and the printed circuit board 40 is realized as described above. In fact, innumerable alternatives and/or expansions of the connection mechanism described are conceivable.

An expansion of the described mechanical connection may for instance include putting the cover part 30 into engagement not only with the shielding cage 42 but additionally with the contact carrier part 20 as well.

To that end, as can be seen particularly from FIG. 1, the contact carrier part 20 can have a spring tab or detent protrusion 24 on its surface that in the assembled state is toward the cover part 30. The tab or detent protrusion 24 comes to rest in or snaps in detent fashion into a corresponding detent opening 32 of the cover part 30, when the contact carrier part 20 and the cover part 30 rest on one another in the intended way. This makes it possible to increase the stability of the mechanical connection between the card reader and the printed circuit board considerably, yet as can be appreciated there is no restriction of the described way in which the contact carrier part 20 and cover part 30 engage one another or are connected.

Figure 8:
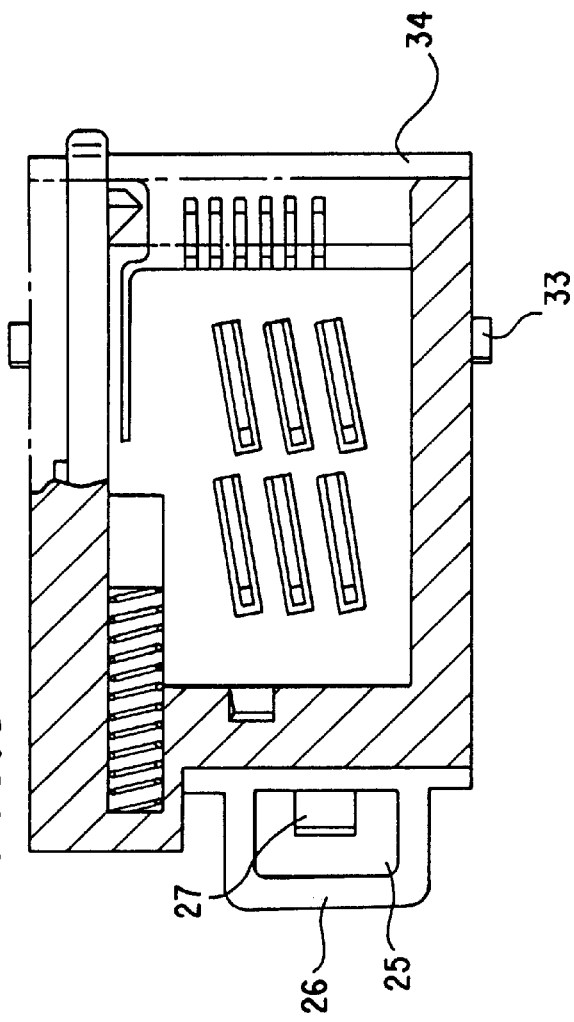
FIG. 8 is a sectional view of the configuration shown in FIG. 6.
Figure 7:
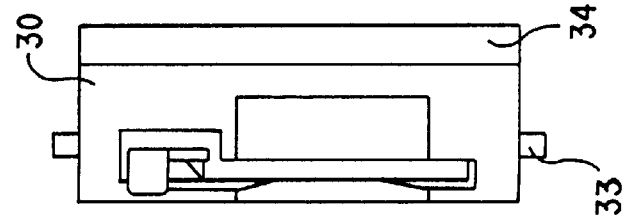
FIG. 7 is a front elevational view of the card reader removed from the configuration shown in FIG. 6 rotated 90°.
Figure 9:
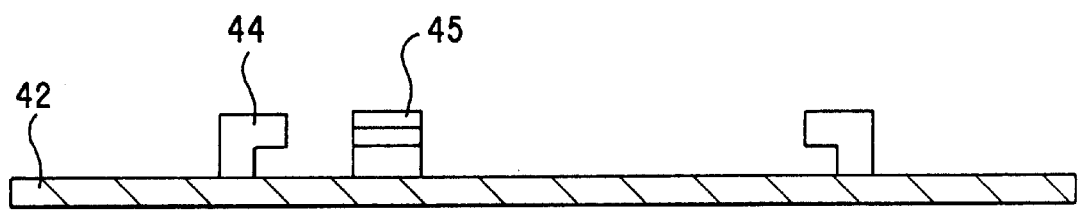
FIG. 9 is a cross-sectional view of a fastening device for fastening a shielding cage to the card reader.

Other possible expansions and/or alternatives to the connection mechanism described will be described below in terms of a further exemplary embodiment of the card reader of the invention, taken in conjunction with FIGS. 6–9, of which FIG. 6 is a view, corresponding to that of FIG. 1, of a configuration containing a card reader in accordance with a second exemplary embodiment. FIG. 7 is a view corresponding to that in FIG. 3 of the card reader removed from the configuration of FIG. 6. FIG. 8 is a view corresponding to that of FIG. 4 of the configuration shown in FIG. 6, and FIG. 9 is a cross-sectional of a fastening device for fastening the shielding cage 42 having the card reader.

The card reader shown in FIGS. 6–8, like the card reader in FIGS. 1–5, again includes the contact carrier part 20 and a cover part 30, which, except for the provisions made for connection to the printed circuit board 40, correspond essentially to the contact carrier part 20 and cover part 30 of FIGS. 1–5.

In the card reader of FIGS. 6–8, the detent levers 31, still present in the first exemplary embodiment, for detent locking to the lateral detent protrusions 43 on the shielding cage 42 are missing. Instead, a number of alternative fastening devices are provided.

A first one of the alternative fastening devices is provided on the contact carrier part 20 and serves to fix it to the shielding cage 42. As seen particularly from FIG. 8, the device includes a detent frame 26, which has a central detent opening 25, and an extension 27.

As can be seen from FIGS. 6–8, the cover part 30 has lateral guide elements 33 and a step-like extension 34 on the front, as the alternative fastening device.

The precise configuration, function and mode of operation of the fastening device will be made more clear by the ensuing description of the mounting of the card reader onto the printed circuit board 40.

First, the contact carrier part 20 and the cover part 30 are placed on one another. In the state in which they are properly placed on one another, the detent protrusion 24 of the contact carrier part 20, which is still present, locks in detent fashion with a detent opening 32 of the cover part 30.

In this state, the card reader is placed on the shielding cage 42 and is displaced on it with guidance by guide and retaining devices provided on the shielding cage 42, in such a way that the card reader finally comes into engagement with a detent hook 45 also provided on the shielding cage 42.

The guide and retaining devices of the shielding cage 42 are provided on the top thereof including rails 44, shown in cross section in FIG. 9, in which the lateral guide elements 33 of the cover part 30 can run.

Once the lateral guide elements 33 of the cover part 30 have been introduced into the rails 44 and the shielding cage 42, the card reader is displaced, as already mentioned in part, along the surface of the shielding cage 42 toward the detent hook 45. When it reaches the detent hook 45, the detent frame 26 of the contact carrier part 20 runs over onto the detent hook 45. Upon continued displacement of the card reader, the detent frame 26 slides, with elastic deformation, away over the detent hook 45 and finally snaps into place into detent fashion over it, assuming its original position. In this state, the detent hook 45, as can be seen particularly in FIG. 6, protrudes through the detent opening 25 of the detent frame 26. At approximately the same time, the extension 27 of the contact carrier part 20 strikes essentially frontally against the detent hook 45, so that continued displacement and also retraction of the card reader is no longer possible without previously manually undoing the connection. The lateral guide elements 33 of the cover part 30 are at this moment still located inside the rails 44 of the shielding cage 42. In this state, the rails 44 no longer act as guide elements but rather as retaining elements. When the detent locking described is achieved, the card reader has reached its intended position on the printed circuit board 40. In order to fix it there reliably in stationary fashion (keeping it immovable), it or more precisely the step-like extension 34 of the cover part 30 can in conclusion be clamped between a clamping element 50 and the printed circuit board 40.

The card reader of the second exemplary embodiment, like the card reader of the first exemplary embodiment, can be connected mechanically and electrically to the printed circuit board solely by detent locking, clamping and the like, that is, with soldering being dispensed with completely.

It is understood that this positive effect is attainable even if the connecting devices used in the described exemplary embodiments of the card reader as well as other suitable connecting devices, not explicitly mentioned, as used individually or in arbitrary other combinations for directly or indirectly connecting the card reader mechanically to the printed circuit board.

In the exemplary embodiments described above, the shielding cage 42 has in each case played a decision role in connecting the card reader and the printed circuit board 40. A disposition of the card reader as shown and described in the drawings next to or above a shielding cage 42 or the like is advantageous in the sense that the card reader can act not only as a carrier of the fastening device but also as a bearing and stop face for the card reader.

At the same time, however, it is understood that there is no restriction whatever that the connection between the card reader and the printed circuit board 40 be made by using a shielding cage 42 and the like.

Depending on given conditions, arbitrary other items and components are possible as the connecting device carrier or connecting devices themselves, among other examples the housing of the configuration accommodating the card reader, other components (especially of a mechanical and electromechanical nature) provided on the printed circuit board 40, or the printed circuit board itself.

We claim:

1. In combination with a printed circuit board having elements, a card reader for receiving and passing on information furnished by or for a card, the card reader mountable on the printed circuit board, comprising:

a card reader body;

a connecting portion disposed on said card reader body making a mechanical connection between said card reader body and the printed circuit board;

contact elements disposed on said card reader body in a locally separated fashion from said connecting portion and making an electrical contact with the printed circuit board;

said card reader body having a contact carrier part carrying said contact elements and a cover part disposed on said carrier part; and said card reader body extending at least partly in an upper plane over the elements mounted on the printed circuit board if said card reader body is mounted on the printed circuit board.

2. The card reader according to claim 1, wherein said contact elements include spring bumps having solder-free contact-pressure connections with contact points for contacting the card and the printed circuit board.

3. The card reader according to claim 1, wherein said card reader body mechanically connects to the printed circuit board without soldering in a detent locking fashion.

4. The card reader according to claim 3, wherein said printed circuit board has a shielding cage, and at least one of said contact carrier part and said cover part detent-locking with the shielding cage.

5. The card reader according to claim 1, wherein said connecting portion and said contact elements are disposed and embodied such that said card reader body cannot be mounted onto the printed circuit board until after the elements to be soldered to the printed circuit board have been soldered.

6. The card reader according to claim 5, wherein said connecting portion and said contact elements are disposed and embodied such that after said card reader body has mounted on the printed circuit board, the card reader body can be detached again from the printed circuit board.

7. In combination with a printed circuit board having elements, a card reader for receiving and passing on information furnished by or for a card, the card reader mountable on the printed circuit board, comprising:

a card reader body;

a connecting portion disposed on said card reader body making a mechanical connection between said card reader body and the printed circuit board;

contact elements disposed on said card reader body in a locally separated fashion from said connecting portion and making an electrical contact with the printed circuit board; and said card reader body extending at least partly in an upper plane over the elements mounted on the printed circuit board if said card reader body is mounted on the printed circuit board;

said connecting portion and said contact elements are disposed and embodied such that said card reader body cannot be mounted onto the printed circuit board until after the elements to be soldered to the printed circuit board have been soldered.

8. The card reader according to claim 7, wherein said connecting portion and said contact elements are disposed and embodied such that after said card reader body has mounted on the printed circuit board, the card reader body can be detached again from the printed circuit board.

* * * * *